D. HARRINGTON.
Galvanic Apparatus.
8736X
Patented March 31, 1835.
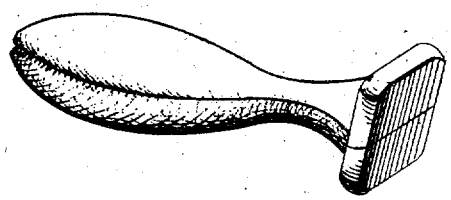
Fig. 1.
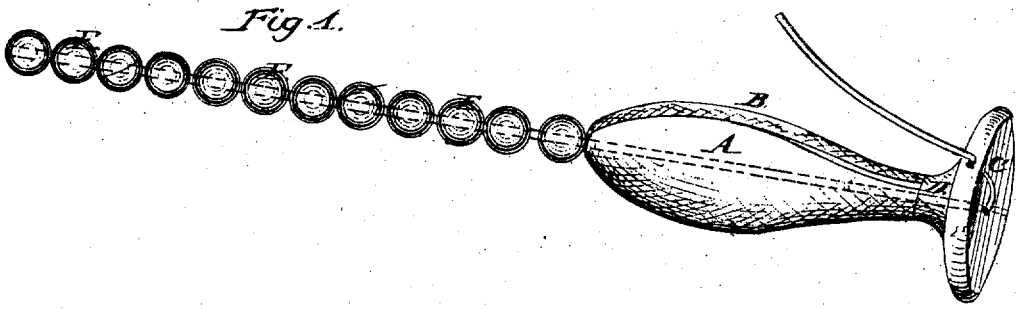

Daniel Harrington

The schedule referred to in the Letters Patent and making part of
the same containing a description in the words of the said
Daniel Harrington himself of his improvements in
an apparatus mode or modes for applying Galvanic Elec-
tricity in the cavities of the human system. for the cure or
relief of diseases. To all whom it may concern
Be it known that I Daniel Harrington of the City
of Philadelphia in the State of Pennsylvania have in-
vented certain instruments for the application of Galvanic
influence to the cure or relief of disease in some of its forms to
which the human body is liable which instruments differ
in certain particulars as will herein appear from those
which I have previously obtained Letters Patent
of the Government of the United States, and I do hereby
declare that the following is a full and exact description
thereof. In forming the instrument which I will first describe
I make a foundation or body of ivory wood or any suitable
substance. This ivory is to be turned into the proper shape
for entering and remaining in the rectum or other external
orifice of the body. The part which is to enter the rectum is
in the form of a long oval which may be about three inches
in its longest and one inch in its shortest diameter.
this is joined by a neck of about half an inch in diameter
to a button which swells out to an inch and a quarter or more
in diameter, this button may be round or oval, the latter
form is perhaps the best all the parts of it are duly curved so
that it may not injure the parts to which it is applied.
The oval part which enters the rectum is to be covered by
two shells of metal having a galvanic action by contact
say one of silver and one of zinc, These shells are in con-
tact at the point which first enters the rectum. and ex-
tend down near to the button or swell before named, their
contact.

contact may be produced by passing the rivets through the two shells from side to side. Through the axis of this instrument a hole is drilled sufficiently large to pass a catgut or string through the same for a purpose to be presently described. Figure 1. in the accompanying drawing represents the instrument of the form and size described. A & B. being the shells of silver and zinc and C. the button of ivory which bears against the rectum when the instrument is introduced, by which and the action of the sphincter on the neck D. it is retained in its place and may be worn for hours without interfering with the action of the body in sitting walking or riding in a carriage. The dotted lines shew the perforation through the axis of the instrument, the object of which I will describe. It is sometimes desirable to stimulate the intestines to a greater height than can be reach'ed by the instrument as described (or by any other inflexible form that can be devised it is believed) with this view I make a number of metallic forms which may round, oval or cylindrical one half of them of silver and the other of zinc, they may be about half an inch or they may be more or less in their diameter. These I string alternatly, the zinc and the silver, upon a cat gut or other suitable cord or string which is secured immovably in the extreme form round or oval and the other end of the cord I pass through the perforation in the ivory leaving the end of the cord to extend a few inches beyond the button. &c These forms or balls as perforated and arranged upon their cord are shewn at E. E. E. In this way a flexible part of any required length may be formed which when passed into the rectum will follow the contortions of the intestines more readily than a bougie. By drawing the string tense through the ivory instrument they may be by the aid of both of the hands very readily entered the cavity, as their pressure together will give to them a requisite stiffness for for the purpose. A flexible part might also be made by other
means, as for example, by winding spirally upon a mandril
a wire or narrow flat-strip of silver and another of zinc, but this
mode of forming a flexible it is thought would have no advantage
over the one first described as to its power and would be found
more difficult to keep clean and more liable to injury in
its correct spiral form from using. One object in using
the ivory within the metallic shells is to give lightness to the
instrument as its operation would be as powerful if the parts
inserted were made of solid metals but the weight in some
cases might be found inconvenient to the [illegible] wearer
In some case it might be found advantageous to use the
flexible arrangement as shewn at E. E. E. without the
first described instrument in which case the means of
securing it in its place by the aid of a strap or other-
wise will be sufficiently obvious. Where from any cause
it may difficult to introduce the instrument first
described on account of its form I make it in two parts di-
vided longitudinally, but in this case it is most conven-
ient to make it wholly of zinc as to its body & plate one
of the halves so far as it is intended to enter a cavity near
ly over its whole surface with silver. The corners where the
two halves fit together are to rounded off and one half
is to be inserted after the other as by so doing the parts will
be less distended than with the instrument first described.
Either this or the first instrument may be confined or held
in place by a strap passing below the coccygis & around
the Perinaeum. The end of the strap to be attached to a
belt above the hips or to the clothes, this however will not
often be found requisite when the instrument is used in
the rectum, but when used in the vagina it may not
unfrequently be found necessary particularly in cases where
a prolapsion of the uterus would tend to eject it &c Although
instruments instruments of the kind described herein produce continued
action which perhaps may not be found to tend in many cases
to such immediate renovating effect as some of those formally
patented by me in which the action was intermitting yet as
they require but little attention on the part of those who use
them may be kept in their places in most instances by
the action of the parts in consequence of the form given to
them and compensate by the length of time which they
may be allowed to remain for a more brief and power-
ful action they will be frequently preferred. When these
instruments are used in the vagina or in cases of suppres-
sed [illegible] or for any other purpose such alteration in their
form and size may be made as the particular circum-
stances of the case will require for example the irritability
of the parts in certain cases may be such as to render the
small part of the instrument which connects the button
with the main or large part inconvenient to the wearer
unless it were made of flexible or elastic materials a flex-
ible connecting portion between the two ends of the instru-
ment may be made of wire bent into spiral form and the
same spiral may be flattened to a necessary extent and
its inner part filled with any flexible substance that
could be saturated with gum elastic sizing (and thereby
prevent its imbibing [illegible] matter (and becom-
ing offensive. I have already indicated the principle
difference between these instruments and such as have an
intermitting action as described in my former specifi-
cations. and they differ also from those in which the two
different metals are applied to different parts of the body &
connected by a wire or other conductor, neither of which is
now claimed. but nothing more than an instrument or
instruments such as I have herein described (subject to
proper variations or modifications necessary to adapt them
to to the respective cases for which they may be deemed suitable) consisting of any two metals which may be found good motors of electricity and combined together in the manner (and for the purpose herein described Witnesses S. A. Jones John D. Clark Daniel Harrington 1692 w.d.

(Drawing.)

Ex. M.G.